(12) United States Patent
Weiser et al.

(10) Patent No.: US 9,292,246 B1
(45) Date of Patent: Mar. 22, 2016

(54) METHOD AND APPARATUS FOR REMOTELY RENDERING A FILE IN A FORMAT APPROPRIATE FOR PRINTING

(71) Applicant: Marvell International Ltd., Hamilton (BM)

(72) Inventors: William B. Weiser, Meridian, ID (US); Lyman Leonard Hall, Nampa, ID (US); Jay R. Shoen, Boise, ID (US)

(73) Assignee: Marvell International Ltd., Hamilton (BM)

( * ) Notice: Subject to any disclaimer, the term of this patent is extended or adjusted under 35 U.S.C. 154(b) by 2 days.

(21) Appl. No.: 14/147,370

(22) Filed: Jan. 3, 2014

Related U.S. Application Data

(60) Provisional application No. 61/749,082, filed on Jan. 4, 2013, provisional application No. 61/751,093, filed on Jan. 10, 2013.

(51) Int. Cl.
| | |
|---|---|
| *G06F 3/12* | (2006.01) |
| *G06K 15/02* | (2006.01) |
| *G06Q 30/02* | (2012.01) |
| *H04N 1/00* | (2006.01) |

(52) U.S. Cl.
CPC .......... *G06F 3/1293* (2013.01); *G06K 15/1803* (2013.01); *G06Q 30/0241* (2013.01)

(58) Field of Classification Search
CPC ... G06F 3/1206; G06F 3/1292; G06F 3/1247; G06T 11/60

USPC .............. 358/1.9, 1.13, 1.15, 1.16, 402, 442; 709/203, 223, 246
See application file for complete search history.

(56) References Cited

U.S. PATENT DOCUMENTS

| | | | |
|---|---|---|---|
| 7,184,159 B2 * | 2/2007 | Bergstrand | 358/1.15 |
| 8,504,425 B2 * | 8/2013 | Peterson | 705/14.72 |
| 2004/0133636 A1 | 7/2004 | Kinoshita et al. | |
| 2004/0167974 A1 * | 8/2004 | Bunn et al. | 709/223 |
| 2005/0062998 A1 | 3/2005 | Kumashio | |
| 2006/0279760 A1 | 12/2006 | Wang et al. | |
| 2008/0117448 A1 * | 5/2008 | Ijams et al. | 358/1.15 |
| 2008/0137131 A1 | 6/2008 | Cavill et al. | |
| 2008/0158581 A1 * | 7/2008 | Ferlitsch | 358/1.13 |
| 2010/0002251 A1 | 1/2010 | Tachibana | |
| 2010/0225966 A1 * | 9/2010 | Bailey et al. | 358/1.15 |

FOREIGN PATENT DOCUMENTS

JP    2004-139158 A    5/2004

* cited by examiner

*Primary Examiner* — Gabriel Garcia (57) ABSTRACT

Some of the embodiments of the present disclosure provide a method comprising: receiving, by a peripheral device, a file for printing; transmitting, by the peripheral device to a server, the file in order to enable the server to render the file in a format that can be printed by the peripheral device; based on transmitting the file to the server, receiving, by the peripheral device from the server, (i) the file rendered in the format that can be printed by the peripheral device, and (ii) an advertisement; printing, by the peripheral device, the file rendered in the format that can be printed by the peripheral device; and displaying the contents of the advertisement on a display of the peripheral device.

16 Claims, 5 Drawing Sheets

METHOD AND APPARATUS FOR REMOTELY RENDERING A FILE IN A FORMAT APPROPRIATE FOR PRINTING

CROSS REFERENCE TO RELATED APPLICATIONS

This claims priority to U.S. Provisional Patent Application No. 61/749,082, filed on Jan. 4, 2013, and to U.S. Provisional Patent Application No. 61/751,093, filed on Jan. 10, 2013, which are incorporated herein by reference.

TECHNICAL FIELD

Embodiments of the present disclosure relate to printing a file, and more particularly, rendering a file in a format that is appropriate for printing the file.

BACKGROUND

A printer may receive print requests to print files from a plethora of consumer electronic devices, e.g., a desktop computer, a laptop, a smart phone, a mobile phone, a tablet, etc. In a situation where, for example, a desktop computer transmits a print request to the printer to print a file, the desktop computer may have appropriate programs and/or print drivers installed to render the file in a format that is appropriate for printing in the printer. Accordingly, the desktop computer renders the file in the format that is appropriate for printing in the printer, and then transmits the rendered version of the file to the printer.

However, for example, in a situation where a mobile phone is to transmit a print request to the printer to print a file, the mobile phone may not have appropriate programs and/or print drivers installed to render the file in the format that is appropriate for printing in the printer (e.g., due to relatively limited capability of the mobile phone compared to a capability of the desktop computer). Also, if the printer receives the file from the mobile phone (e.g., without the file being rendered in the mobile phone), the printer also may not have appropriate programs installed to render the file in the format that is appropriate for printing in the printer. In such a situation, the printer may not be able to print the file received from the mobile phone.

In another example, a memory card (e.g., a flash drive) storing a file may be inserted in an appropriate slot of a printer. A user may want to print the file directly from the memory card to the printer. However, the printer may not have appropriate programs installed to render the file in the format that is appropriate for printing in the printer.

SUMMARY

In various embodiments, the present disclosure describes a method comprising: receiving, by a peripheral device, a file for printing; transmitting, by the peripheral device to a server, the file in order to enable the server to render the file in a format that can be printed by the peripheral device; based on transmitting the file to the server, receiving, by the peripheral device from the server, (i) the file rendered in the format that can be printed by the peripheral device, and (ii) an advertisement; printing, by the peripheral device, the file rendered in the format that can be printed by the peripheral device; and displaying the contents of the advertisement on a display of the peripheral device.

In various embodiments, the present disclosure describes a peripheral device comprising: a communication interface configured to receive a file for printing; a transmission module configured to transmit, to a server, the file in order to enable the server to render the file in a format that can be printed by the peripheral device; a reception module configured to receive, from the server, the file rendered in the format that can be printed by the peripheral device; and a printing module configured to print the file rendered in the format that can be printed by the peripheral device.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure.

DETAILED DESCRIPTION

Figure 1:
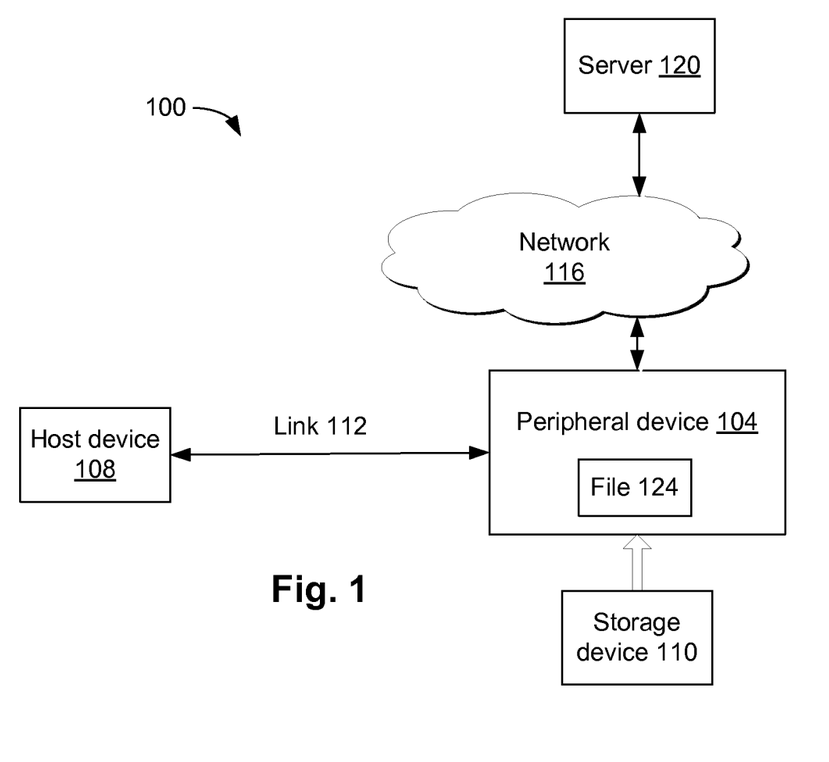
FIG. 1 schematically illustrates a system comprising a server configured to remotely render files in a format that is appropriate for printing in a peripheral device.

FIG. 1 schematically illustrates a system 100 comprising a server 120 configured to remotely render files in a format that is appropriate for printing in a peripheral device 104. In an embodiment, the peripheral device 104 is coupled to a host device 108 over a communication link 112 (henceforth referred to as "link 112"). In an embodiment, the peripheral device 104 is a printing device configured to perform printing operations. For example, the peripheral device 104 is a printer, e.g., a laser printer, an ink-jet printer, a color printer, a monochrome printer, a multi-function printer, and/or the like. For printing operations, contents of a file are printed by the peripheral device 104 on a tangible medium (e.g., a paper).

The host device 108 is, for example, a personal computer, a desktop computer, a laptop, a tablet computer, a smart phone, a mobile phone, a handheld device, and/or any consumer electronic device capable of interfacing with a peripheral device. Although the peripheral device 104 is illustrated in FIG. 1 as communicating with only one host device, in an embodiment, the peripheral device 104 may communicate with more than one host device.

The peripheral device 104 is coupled to the host device 108 over the link 112. The link 112 may be any appropriate type of link, e.g., a wired communication link (e.g., an Ethernet link, a Universal Serial Link (USB), etc.) and/or a wireless communication link (e.g., a wireless communication link based on Institute of Electrical and Electronics Engineers (IEEE) 802.11 family of standards, Bluetooth® standards, etc.). In an embodiment, the host device 108 is communicatively coupled to the peripheral device 104 over a network (e.g., the Internet)—in such an embodiment, the link 112 in part represents the network used to communicatively connect the host device 108 and the peripheral device 104.

In an embodiment, the peripheral device 104 is also configured to be coupled to a storage device 110. For example, the peripheral device 104 has a communication slot in which the storage device 110 can be inserted. The storage device 110 comprises, for example, a memory card that can be used in a consumer electronics device (e.g., a memory card used in a camera), a flash memory drive, a mass storage drive, etc. The storage device 110 is configured to store files comprising images, texts, etc.

In an embodiment, the peripheral device 104 is configured to communicate with the server 120 over a network 116. The network 116 is, for example, a local area network, a wide area network, the Internet, and/or the like. The server 120 provides file rendering services to the peripheral device 104, as will be discussed in detail herein later. Although FIG. 1 illustrates only one server 120, in an embodiment, the server 120 may represent a plurality of servers associated with a service provider providing file rendering services to the peripheral device 104.

Figure 2:
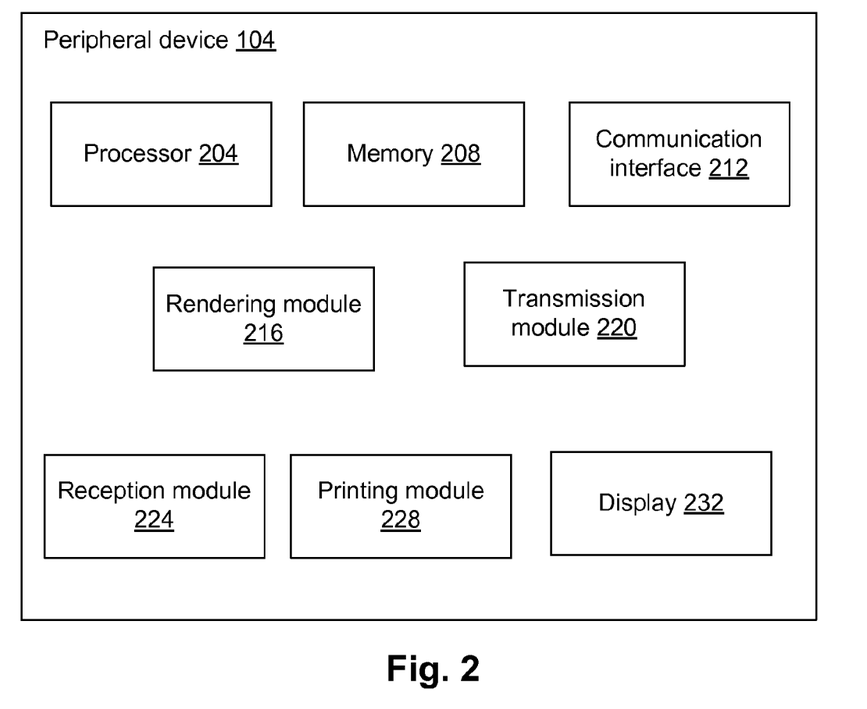
FIG. 2 schematically illustrates the peripheral device of FIG. 1 in more detail.

FIG. 2 schematically illustrates the peripheral device 104 of FIG. 1 in more detail. In an embodiment, the peripheral device 104 comprises a processor 204, a memory 208 and a display 232. The processor 208 includes one or more processors configured to execute instructions. The instructions are stored in the memory 208. The display 232 is configured to display information associated with the operation of the peripheral device 104. The peripheral device 104 further comprises a communication interface 212 configured to facilitate communication with the host device 108 and/or the storage device 110.

The peripheral device 104 comprises a plurality of modules. As used herein, the term "module" may refer to, be part of, or include an Application Specific Integrated Circuit (ASIC), an electronic circuit, a processor (shared, dedicated, or group, e.g., the processor 204) and/or memory (shared, dedicated, or group, e.g., the memory 208) that execute one or more software or firmware programs, a combinational logic circuit, and/or other suitable components that provide a described functionality. In an embodiment, the peripheral device 104 comprises a rendering module 216, a transmission module 220, a reception module 224 and a printing module 228, each of which will be discussed in detail herein later.

Referring again to FIG. 1, in an embodiment, the peripheral device 104 receives a file (e.g., a file 124) for printing from either the host device 108 or the storage device 110. For example, a user of the host device 108 may want to print the file 124 (or a part of the file 124, e.g., one or more pages of the file 124), and transmit the file 124, accompanied by an appropriate print request, to the peripheral device 104 (e.g., via the link 112). In another example, the storage device 110, which stores the file 126, is inserted in a slot of the peripheral device 104. A user of the peripheral device 104 or the storage device 110 selects, using a display of the peripheral device 104, the file 124 stored in the storage device 110, for printing the contents of the file 124. Based on the selection, the peripheral device 104 receives the file 124 from the storage device 110 for printing.

The file 124 received for printing by the peripheral device 104 has any appropriate format or document type, e.g., .doc, .pdf, .jpg, .gif, and so on. For example, the file 124 can be a Microsoft Office® document, an Adobe Acrobat® document, an image file, or the like. However, the format of the file 124 can be such that the peripheral device 104 is unable to properly open the file 124 or render the file 124 for printing on the peripheral device 104 (e.g., due to lack of an appropriate application program installed in the peripheral device 104). For example, the file 124 is a Microsoft Word® document, which the peripheral device 104 is unable to properly open or render for printing.

In an embodiment, subsequent to receiving the file 124, the peripheral device 104 (e.g., the rendering module 216) determines if the file 124 is already rendered in an appropriate format for printing in the peripheral device 104. For example, the file 124 received from the host device 108 may be already in the appropriate format that can be printed by the peripheral device 104. As an example, the host device 108 renders the file 124, and transmits the rendered version of the file 124 to the peripheral device 104 (i.e., the host device 108 has an appropriate program installed to render the file 124 in the appropriate format for printing on the peripheral device 104). In such an embodiment, the rendering module 216 does not need to render the file 124, and the file 124 is printed by the printing module 228.

In another example, the rendering module 216 may determine that the file 124 is not already rendered in the appropriate format for printing in the peripheral device 104 (e.g., the host device 108 does not have an appropriate program installed to render the file 124 in the appropriate format for printing on the peripheral device 104).

If the rendering module 216 determines that the file 124 is not already rendered in the appropriate format for printing in the peripheral device 104, the rendering module 216 then determines if the peripheral device 104 can render the file 124. For example, the file 124 may be of a specific type, and the peripheral device 104 may have an associated program installed to render the file 124 for printing in the peripheral device 104. If the peripheral device 104 determines that the peripheral device 104 can render the file 124, then the peripheral device 104 (e.g., the rendering module 216) renders the file 124 in the appropriate format that can be printed by the peripheral device 104. Subsequently, the rendered file is printed by the peripheral device 104 (e.g., by the printing module 228).

In another example, the peripheral device 104 determines that the peripheral device 104 cannot render the file 124 in an appropriate format that can be printed by the peripheral device 104. For example, the peripheral device 104 does not have appropriate program installed to render the file 124. In such a case, the peripheral device 104 (e.g., the transmission module 220) transmits the file 124 to the server 120. In an embodiment, the peripheral device 104 (e.g., the transmission module 220) also transmits to the server 120 various configuration information associated with the peripheral device 104. For example, the peripheral device 104 transmits to the server 120 various configuration information associated with a type of the peripheral device 104, a format of images that can be printed by the peripheral device 104, various settings associated with the peripheral device 104 (e.g., printing resolutions supported by the peripheral device 104, print settings supported by the peripheral device 104, etc.).

In an embodiment, the peripheral device 104 (e.g., the transmission module 220) also transmits to the server 120 various configuration information associated with printing the file 124. For example, the peripheral device 104 receives a print request along with receiving the file 124, wherein the print request provides various print parameters associated with printing the file 124. For example, the print request can specify a resolution for printing the file 124, whether the file 124 is to be printed in grey-scale or using full color space, etc. The peripheral device 104 also transmits to the server 120 such configuration information associated with printing the file 124.

In an embodiment, the server 120 has appropriate programs installed to render various types of files. For example, the server 120 has a large library of print drivers and data conversion routines to render the file 124 to a format that can be printed by the peripheral device 104. Upon receiving the file 124 from the peripheral device 104 (e.g., along with various configuration information associated with the peripheral device 104 and associated with printing the file 124), the server 120 renders the file 124 in an appropriate format that can be printed by the peripheral device 104. In an embodiment, the server 120 renders the file 124 for printing based at least in part on various configuration information received with the file 124 (e.g., number of pages to be printed, quality of printing, color to be used for printing, etc.).

Subsequently, the server 120 transmits the rendered version of the file 124 to the peripheral device 104. Once the peripheral device 104 (e.g., the reception module 224) receives the rendered version of the file 124 from the server 120, the peripheral device 104 (e.g., the printing module 228) prints the file 124, as rendered by the server 120.

In an embodiment, the server 120 is maintained or provided by a manufacturer of the peripheral device 104. For example, the manufacturer of the peripheral device 104 advertises the peripheral device 104 to be compatible with a range of host devices (e.g., smart phones, tablets, etc.), and the peripheral device 104 can print many types of files received from any host device by using the service provided by the server 120.

In another embodiment, the server 120 is maintained or provided by a manufacturer or a service provider associated with the host device 108. For example, the manufacturer or the service provider of the host device 108 provides the server 120, in order to facilitate printing files of various types of files from the host device 108 to a peripheral device (e.g., the peripheral device 104).

In another embodiment, the server 120 is maintained by a third party provider (e.g., not associated with the manufacturer of the peripheral device 104 or the host device 108). In an example, such a third party provider collects revenue from the user of the host device 108, the storage device 100 and/or the peripheral device 104, to render the file 124 in the format appropriate for printing in the peripheral device 104. In another example, such a third party provider provides advertisement in the peripheral device 104, in exchange for rendering the file 124 in the format appropriate for printing in the peripheral device 104. For example, while transmitting to the peripheral device 104 the rendered version of the file 124 for printing in the peripheral device 104, the server 120 also transmits one or more pages of advertisements for printing in the peripheral device 104 or for displaying in a display (e.g., the display 232) of the peripheral device 104.

In an embodiment, the advertisements are generated by the server 120 based on the contents of the file 124. For example, the server 120 performs a character recognition in the contents of the file 124; based on the character recognition, generates one or more targeted advertisements; and transmits the generated advertisements to the peripheral device 104 (e.g., along with the rendered version of the file 124) for printing or displaying in the peripheral device 104.

In an embodiment, a quality associated with rendering the file 124 by the server 120 is based on an agreement between the server 120 and the peripheral device 104. As an example, the server 120 renders the file 124 with a relatively low resolution (or using black and white color) for free for printing by the peripheral device 104. However, for a fee (e.g., if the user of the peripheral device 104 or the host 108 pays the server 120), the server 120 renders the file 124 with a relatively high resolution (or a colored version of the rendered file) for printing by the peripheral device 104. Additionally or alternatively, if the user of the peripheral device 104 agrees to display or print advertisements provided by the server 120 in the peripheral device 104, the server 120 renders the file 124 with a relatively high resolution (or using colored version of the rendered file) for printing by the peripheral device 104.

In an embodiment, communications between the peripheral device 104 and the server 120 are encrypted, e.g., to securely communicate the file 124 and the rendered version of the file between the peripheral device 104 and the server 120.

Using the service of the server 120 to render the file 124 in the appropriate format for printing in the peripheral device 104 has several advantages. For example, as the server 120 renders the file 124, the file 124 does not need to be rendered by the host device 108. Thus, the host device 108 does not need to have appropriate print drivers or programs installed to render various types of files. This is beneficial especially if the host device 108 is, for example, a mobile device, a smart phone, etc., as in such a case, the host device 108 may not have necessary programs installed to view, open or render the file 124. For similar reasons, various types of files can be stored in the storage device 110 and printed in the peripheral device 104, even if the peripheral device 104 does not have an ability to open, process or render the file 124. Also, the rendering of the file 124 by the server 120 is transparent to the host device 108. For example, the host device 108 transmits the file 124 to the peripheral device 104, and is not aware of the peripheral device 104 using the service of the server 120 to render the file 120. Thus, the host device 108 does not need to have any programs or applications installed to use the service of the server 120 to render the file 124.

Figure 3:
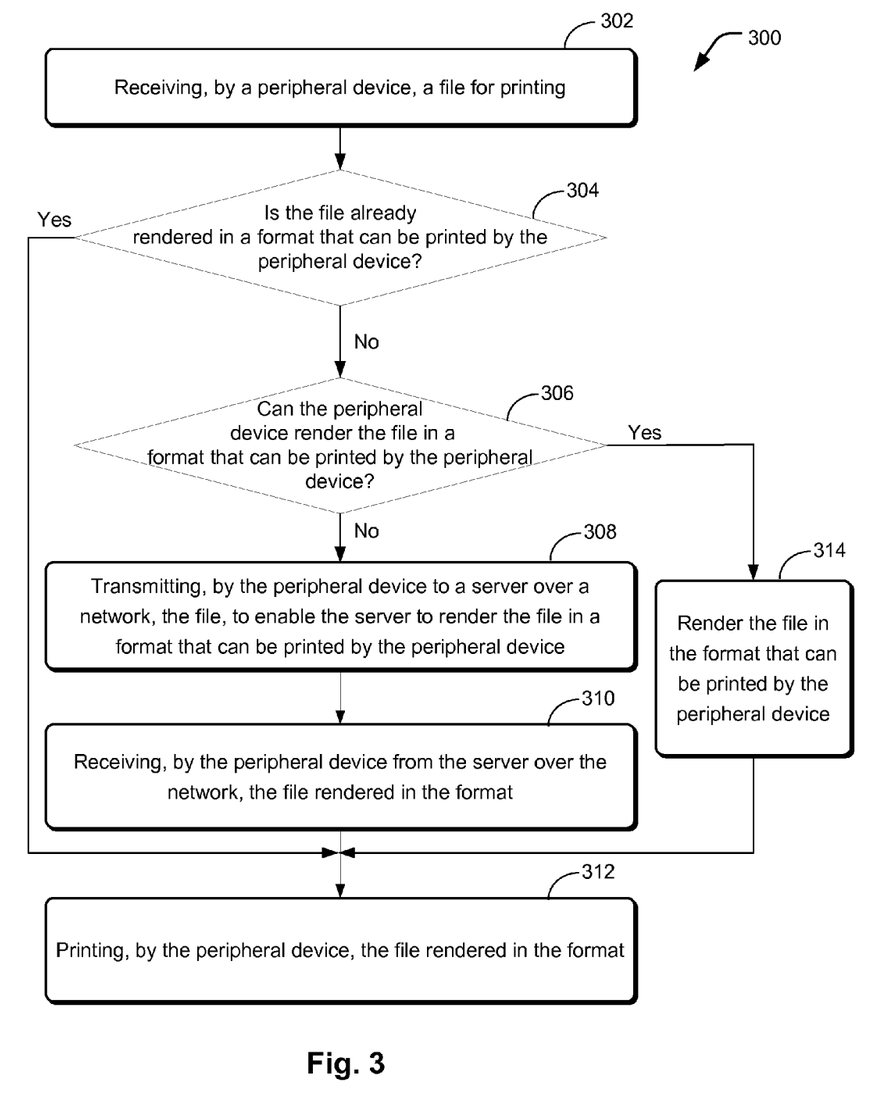
FIG. 3 illustrates an example method for remotely rendering files in a format that is appropriate for printing in a peripheral device.

FIG. 3 illustrates an example method 300 for remotely rendering files in a format that is appropriate for printing in a peripheral device. At 302, a peripheral device, e.g., the peripheral device 104 of FIG. 1 (e.g., the communication interface 212 of the peripheral device 104), receives a file (e.g., the file 124 of FIG. 1) for printing. In an example, the file is received from one of a host device, a storage device, or the like, as discussed with respect to FIG. 1. At 304, the peripheral device (e.g., the rendering module 216) determines if the file is already rendered in a format that can be printed by the peripheral device. If the file is already rendered in the format that can be printed by the peripheral device (i.e., if "Yes" at 304), then at 312, the peripheral device (e.g., the printing module 228) prints the file rendered in the format.

If the file is not rendered in the format that can be printed by the peripheral device (i.e., if "No" at 304), then at 306, the peripheral device (e.g., the rendering module 216) determines if the peripheral device can render the file in the format that can be printed by the peripheral device. If the peripheral device can render the file in the format that can be printed by the peripheral device (i.e., if "Yes" at 306), then at 314, the file is rendered (e.g., by the rendering module 216) in the format that can be printed by the peripheral device, and at 312, the peripheral device (e.g., the printing module 228) prints the file rendered in the format.

If the peripheral device cannot render the file in the format that can be printed by the peripheral device (i.e., if "No" at 306), then at 308, the peripheral device (e.g., the transmission module 220) transmits to a server (e.g., the server 120) over a network (e.g., the network 116), the file, to enable the server to render the file in the format that can be printed by the peripheral device. At 310, the peripheral device (e.g., the reception module 224) receives from the server over the network, the file rendered in the format. At 312, the peripheral device (e.g., the printing module 228) prints the file rendered in the format.

Remote Printing

As previously discussed, in an embodiment, the host device 108 of FIG. 1 can be communicatively coupled to the peripheral device 104 over a network (e.g., the Internet, a local area network, etc.)—in such an embodiment, the link 112 in part represents the network used to communicatively connect the host device 108 and the peripheral device 104. For example, the host device 108 can be located remotely from the peripheral device 104 (e.g., the host device 108 and the peripheral device 104 may be located in two different rooms, two different buildings, or even two different cities or countries). For example, a driver program of the peripheral device 104 is installed in the host device 104, where the driver program comprises a network address and/or location information of the peripheral device 104. The host device 104 can print in the peripheral device 104 remotely over the network (i.e., the link 112, which comprises the network), e.g., using the network address and/or location information of the peripheral device 104.

For example, when the host device 108 transmits a file for printing in the peripheral device 104 over the network, the print job can be held at the peripheral device 104. In another example, when the host device 108 transmits a file for printing in the peripheral device 104 over the network, the peripheral device 104 transmits the file to the server 120 for rendering, receives the rendered version of the file for printing, and holds the rendered version of the file at the peripheral device 104 for printing. When a user of the host device 108 wants the file to be printed, the host device 108 sends another confirmation command to the peripheral device 104, where the confirmation command includes, for example, a previously agreed upon password or a security code. Upon receiving the confirmation command, the peripheral device 104 prints the file that was previously held by the peripheral device 104.

In another example, after the peripheral device 104 holds the file (or a rendered version of the file) for printing, the user of the host device 108 (e.g., or a friend or representative of the host device 108) enters a previously agreed upon password or a security code in the peripheral device 104 (e.g., via a keypad or a display of the peripheral device 104). Upon receiving the previously agreed upon password or security code, the peripheral device 104 prints the file (or a rendered version of the file) that was hold by the peripheral device 104 for printing.

Remote printing, as discussed above, may be useful, for example, when one desires to print a picture or a photo at a peripheral device of a relative living at a different location.

Out-of-Band Event Notification from a Peripheral Device

Figure 4:
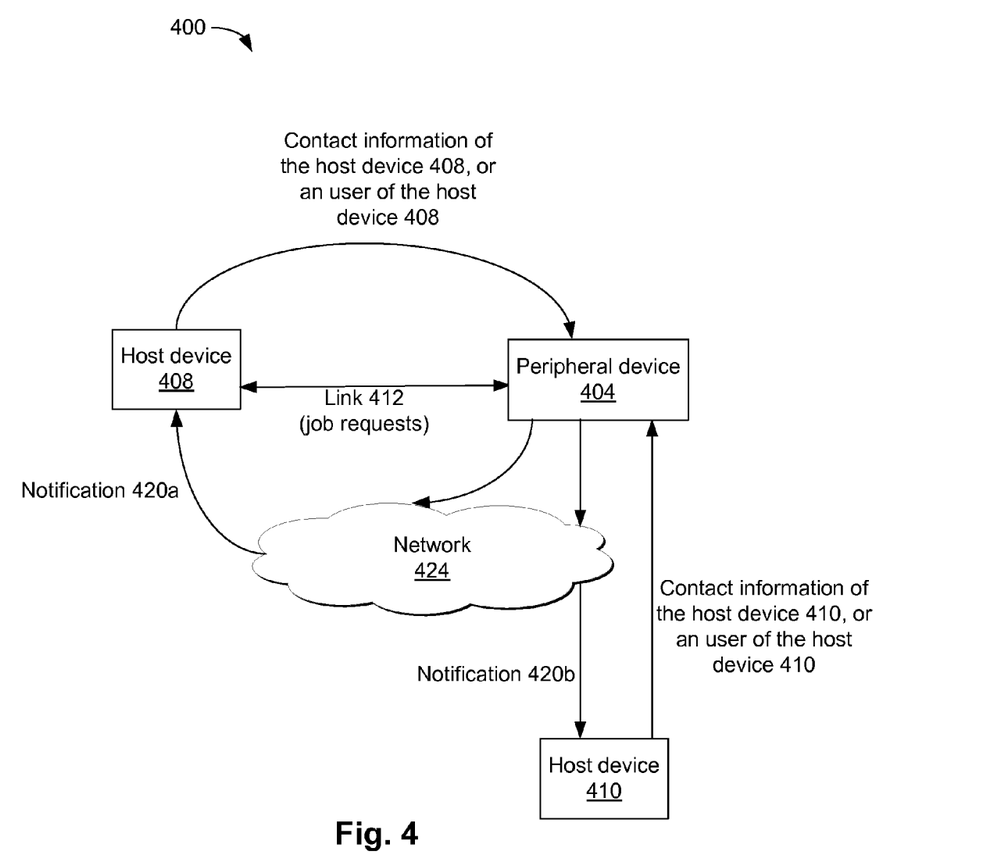
FIG. 4 schematically illustrates a system comprising a peripheral device configured to generate and transmit event notifications to one or more host devices.

FIG. 4 schematically illustrates a system 400 comprising a peripheral device 404 configured to generate and transmit event notifications to one or more host devices 408, 410. In an embodiment, the peripheral device 104 is a printing device configured to perform printing operations, a scanning device configured to scan a document, a copying device to copy a document, a faxing device to transmit and/or receive fax, or a combination of two or more of these devices. For example, the peripheral device 104 is a printer, a scanner, a fax machine, a photo-copier, a multi-function printer, and/or the like.

Each of the host devices 408 and 410 is, for example, a personal computer, a desktop computer, a laptop, a tablet computer, a smart phone, a mobile phone, a handheld device, and/or any consumer electronic device capable of interfacing with a peripheral device. Although the peripheral device 404 is illustrated in FIG. 4 as communicating with two host devices, in an embodiment, the peripheral device 104 may communicate with one, three or more host devices.

The peripheral device 404 is coupled to the host device 408 over a communication link 412 (henceforth referred to as "link 412"). The link 412 may be any appropriate type of link, e.g., a wired communication link (e.g., an Ethernet link, a Universal Serial Link (USB), etc.) and/or a wireless communication link (e.g., a wireless communication link based on Institute of Electrical and Electronics Engineers (IEEE) 802.11 family of standards, Bluetooth® standards, etc.). In an embodiment, the host device 408 is communicatively coupled to the peripheral device 404 over a network (e.g., the Internet). In such an embodiment, the link 412 in part represents the network used to communicatively connect the host device 408 and the peripheral device 404. In an embodiment and although not illustrated in FIG. 4, the host device 410 is also coupled to the peripheral device 404 via a communication link that is, for example, similar to the link 412.

In an example, the host device 408 is configured to transmit, for example, a print request, a scan request, a fax request, and/or the like, to the peripheral device 404 via the link 412. In another example, the host device 408 is configured to receive, for example, a scanned document or a fax document from the peripheral device 404 via the link 412. Thus, the link 412 is used to communicate print requests, scanned documents, etc. between the host device 408 and the peripheral device 404. For the purposes of this disclosure, a job request refers to a print request, a scan request, a fax request, and/or the like (e.g., any appropriate requests associated with a print operation, a scan operation, a fax operation, and/or the like, performed by a peripheral device), transmitted by a host device (e.g., the host device 408) to a peripheral device (e.g., peripheral device 404) via, for example, the link 412. FIG. 4 illustrates a job request being transmitted from the host device 408 to the peripheral device 404 via the link 412.

In an embodiment, communication via the link 412 (e.g., communication of a job request) is based on a communication protocol that is typically used by the peripheral device 404 to communicate with a connected host device. As an example, communication via the link 412 is based on a printer job language (PJL) that is typically used by the peripheral device 404 to communicate with a connected host device. In an embodiment, the communication protocol used to communicate a job request via the link 412 is based on a type of the peripheral device 404, a make and model of the peripheral device 404, a print driver installed in the host device 408, etc.

In an embodiment, the host device 408 and/or the host device 410 transmit job requests to the peripheral device 404 (although, in another embodiment, only the host device 408, and not the host device 410, transmits job requests to the peripheral device 404). Furthermore, the host device 410 is accessed by an administrator of the peripheral device 404. For example, the peripheral device 404 may be installed in an office, and is used for printing documents from several host devices. An administrator is responsible for overseeing operations of the peripheral device 404 (e.g., refill paper in the peripheral device 404, troubleshoot when there is a fault or paper-jam in the peripheral device 404, order and refill toner for the peripheral device 404, etc.). In an embodiment, the administrator uses the host device 410, in which the administrator receives notifications from the peripheral device 404, as will be discussed in detail herein later.

In an embodiment, the host device 408 transmits to the peripheral device 404 contact information of the host device 408 or contact information of a user of the host device 408 (collectively referred to herein as "contact information associated with the host device 408"), as illustrated in FIG. 4. Although FIG. 4 illustrates the contact information associated with the host device 408 being transmitted to the peripheral device 404 over a link that is different from the link 412, in an embodiment, the contact information associated with the host device 408 can be transmitted to the peripheral device 404 via the link 412 (or via any other appropriate link). For example, the contact information associated with the host device 408 can be transmitted to the peripheral device 404 via the link 412, while the host 408 transmits a job request (e.g., a print request) to the peripheral device 404. In an embodiment, the contact information associated with the host device 408 can be transmitted to the peripheral device 404 while, for example, a device driver of the peripheral device 404 is being installed in the host device 408. In another embodiment, the contact information associated with the host device 408 can be transmitted to the peripheral device 404 at any other time. In an example, the contact information associated with the host device 408 can be transmitted to the peripheral device 404 each time the host device 408 transmits a job request to the peripheral device 404. Alternatively, the contact information associated with the host device 408 can be transmitted to the peripheral device 404 only once (and not each time the host device 408 transmits a job request to the peripheral device 404).

In an embodiment, the contact information associated with the host device 408 comprises, for example, contact information of the host device 408, e.g., a telephone number of the host device 408. In an embodiment, the contact information associated with the host device 408 comprises, for example, contact information of a user of the host device 408, e.g., an e-mail address that can be accessed by the user of the host device 408, an identification (e.g., a user ID) used by the user of the host device 408 in a social networking website, a chat contact information of the user, a hashtag used by the user in a social networking website or a blogging website, etc.

In an embodiment, the peripheral device 404 can also receive contact information associated with the host device 410. For example, as previously discussed, the host device 410 is accessed by an administrator of the peripheral device 404. Thus, contact information associated with the host device 410 comprises contact information of the host device 410 and contact information of the administrator (e.g., who is the user of the host device 410).

The peripheral device 404 transmits various event notifications to the host devices 408, 410 and/or the users of the host devices 408, 410. For example, FIG. 4 illustrates the peripheral device 404 transmitting a notification 420a to the host device 408 and/or the user of the host device 408, and transmitting a notification 420b to the host device 410 and/or the user of the host device 410.

The notifications 420a, 420b are transmitted using a communication protocol that is different from a communication protocol used for communication over the link 412. For example, the notifications 420a, 420b are send using e-mails to the users of the host devices 408, 410, short message service (SMS) messages to the host devices 408, 410, chat notifications to the users of the host devices 408, 410, blog posts in a blogging website using hashtags associated with the users of the host devices 408, 410, posting in a social networking website accessed by the users of the host devices 408, 410, and/or the like. The notifications 420a, 420b are transmitted based on the contact information associated with the host devices 408, 410 received by the peripheral device 404.

In an embodiment, the notifications 420a, 420b are transmitted over a network that can be different from the link 412. For example, the notification 420a is transmitted in the form of an SMS using a telephone network (e.g., via a server associated with the telephone network) that is at least in part different from the link 412. In another example, the notification 420a is transmitted in the form of an e-mail using a network (e.g., the Internet) that is at least in part different from the link 412. In an embodiment, the notifications 420a, 420b are transmitted via a network 424, e.g., the Internet, a telephone network, a wide area network, a local area network, and/or the like.

In an embodiment, the notifications 420a, 420b comprises various event notifications associated with a status of a job request and/or a status of the peripheral device 404. For example, in response to a completion of a print job received from the host device 408 (or non-completion of the print job due to a fault in the peripheral device 404), the peripheral device 404 transmits a corresponding notification 420a to the host device 408 (or to a user of the host device 408). In another example, in response to receiving a fax, the peripheral device 404 transmits a corresponding notification 420b to the host device 410 (or to the administrator, who is the user of the host device 410). In another example, in response to a fault in the peripheral device 404 (e.g., a paper jam event), the peripheral device 404 transmits a corresponding notification 420b to the host device 410 (or to the administrator, who is the user of the host device 410). In another example, the peripheral device 404 transmits various consumables related events (e.g., to indicate a need to refill paper or toner in the peripheral device 404) via a corresponding notification 420b to the host device 410 (or to the administrator, who is the user of the host device 410). The notifications 408, 410 can include any other types of notifications associated with a status of a job request and/or a status of the peripheral device 404. The peripheral device 404 can be configured to indicate when to transmit these notifications, and to whom to transmit these notifications.

Figure 5:
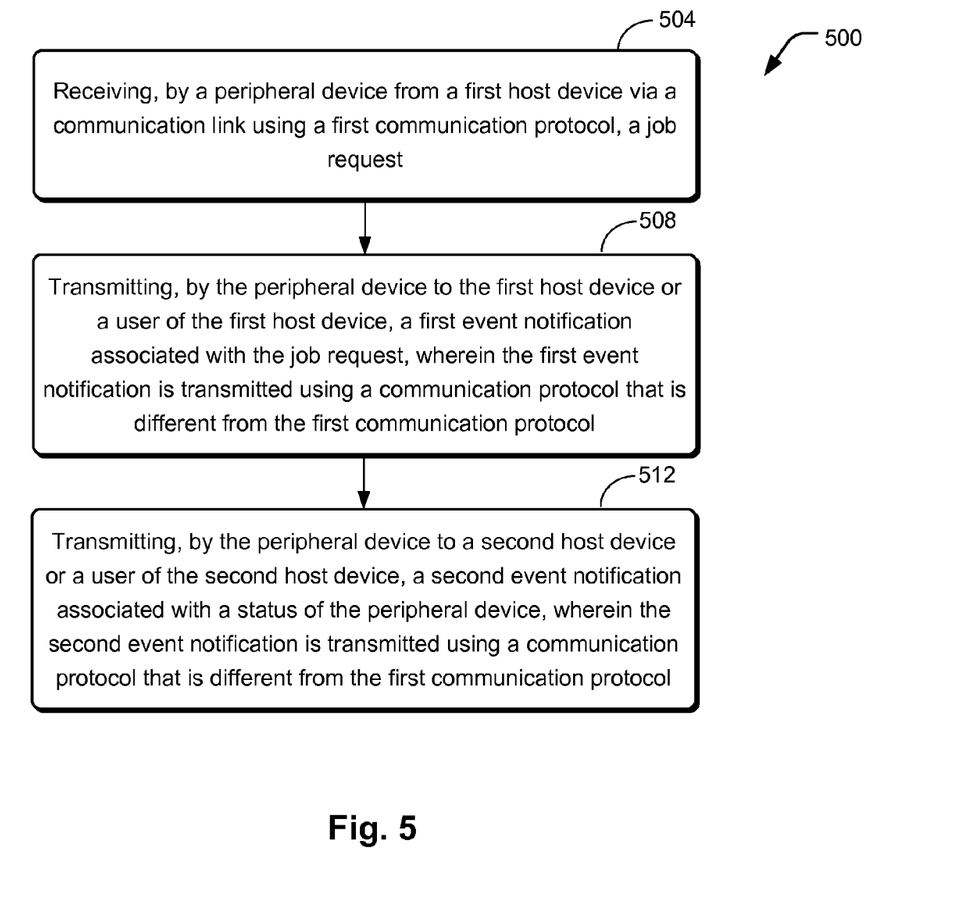
FIG. 5 illustrates an example method for transmitting, by a peripheral device, out-of-band event notifications.

FIG. 5 illustrates an example method 500 for transmitting, by a peripheral device, out-of-band event notifications. At 504, a peripheral device (e.g., the peripheral device 404 of FIG. 4) receives, from a first host device (e.g., host device 408) via a communication link (e.g., link 412) using a first communication protocol, a job request (e.g., a print request). At 508, the peripheral device transmits to the first host device or a user of the first host device, a first event notification associated with the job request (e.g., a completion of the job request, a stall of the job request due to a fault in the peripheral device, etc.), wherein the first event notification is transmitted using a communication protocol that is different from the first communication protocol. At 512, the peripheral device transmits to a second host device (e.g., host device 410 of FIG. 4) or a user of the second host device, a second event notification associated with a status of the peripheral device (e.g., a fault in the peripheral device, need to refill a toner in the peripheral device, etc.), wherein the second event notification is transmitted using a communication protocol that is different from the first communication protocol. In an example, the first event notification or the second event notification is transmitted using an e-mail, SMS, chat notifications, micro-blogging posts, posting in a social networking website, and/or the like. Although in FIG. 5, operations at 512 is illustrated to be performed subsequent to performing operations at 504 and 508, in an embodiment, the operations may be performed in a different order (e.g., the operations at 512 may be performed independent of the operations at 504 and/or 508).

In accordance with various embodiments, an article of manufacture may be provided that includes a storage medium having instructions stored thereon that, if executed, result in the operations described herein with respect to the methods 300 and 500 (and/or various other operations discussed in the present disclosure). In an embodiment, the storage medium comprises some type of non-transitory memory (not shown).

In accordance with various embodiments, the article of manufacture may be a computer-readable medium such as, for example, software or firmware.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A method comprising:
   receiving, by a peripheral device from a host device, a file for printing, wherein the host device is unable to render the file in a format that can be printed by the peripheral device;
   receiving, by the peripheral device, a print setting associated with printing the file;
   transmitting, by the peripheral device to a server, (i) the file in order to enable the server to render the file in the format that can be printed by the peripheral device and (ii) the print setting associated with printing the file in order to enable the server to render the file based on the print setting associated with printing the file;
   based on transmitting the file to the server, receiving, by the peripheral device from the server, (i) the file rendered in the format that can be printed by the peripheral device, and (ii) an advertisement;
   printing, by the peripheral device, the file rendered in the format that can be printed by the peripheral device; and
   displaying the contents of the advertisement on a display of the peripheral device.

2. The method of claim 1, wherein receiving the file for printing comprises:
   receiving the file for printing from a storage device inserted in the peripheral device.

3. The method of claim 1, wherein transmitting, by the peripheral device to the server, the file further comprises:
   transmitting, by the peripheral device to the server, the file over a network.

4. The method of claim 3, wherein the network is the Internet.

5. The method of claim 1, further comprising:
   transmitting, by the peripheral device to the server, a configuration parameter associated with the peripheral device, in order to enable the server to render the file based on the configuration parameter associated with the peripheral device.

6. The method of claim 1, wherein the host device is located remotely from the peripheral device, and wherein printing the file rendered in the format that can be printed by the peripheral device further comprises:
   subsequent to receiving the file rendered in the format that can be printed by the peripheral device, receiving, by the peripheral device, from one of (i) the host device, (i) a user of the host device, or (iii) a representative of the user of the host device, a confirmation command to print the file; and
   based on receiving the confirmation command, printing, by the peripheral device, the file rendered in the format that can be printed by the peripheral device.

7. The method of claim 1, wherein transmitting, by the peripheral device to the server, the file further comprises:
   determining that the peripheral device cannot render the file in the format that can be printed by the peripheral device; and
   in response to determining that the peripheral device cannot render the file in the format that can be printed by the peripheral device, transmitting, by the peripheral device to the server, the file.

8. The method of claim 1, wherein the peripheral device is a printer.

9. A peripheral device comprising:
   a communication interface configured to (i) receive, from a host device, a file for printing and (ii) receive a print setting associated with printing the file, wherein the host device is unable to render the file in a format that can be printed by the peripheral device;
   a transmission module configured to transmit, to a server, (i) the file in order to enable the server to render the file in the format that can be printed by the peripheral device and (ii) the print setting associated with printing the file in order to enable the server to render the file based on the print setting associated with printing the file;
   a reception module configured to receive, from the server, the file rendered in the format that can be printed by the peripheral device; and
   a printing module configured to print the file rendered in the format that can be printed by the peripheral device.

10. The peripheral device of claim 9, wherein the communication interface is configured to receive the file for printing from a storage device inserted in the peripheral device.

11. The peripheral device of claim 9, wherein the transmission module is configured to transmit, to the server, the file over a network.

12. The peripheral device of claim 11, wherein the network is the Internet.

13. The peripheral device of claim 9, wherein the transmission module is further configured to:
   transmit, to the server, a configuration parameter associated with the peripheral device in order to enable the server to render the file based on the configuration parameter associated with the peripheral device.

14. The peripheral device of claim 9, wherein:
   the reception module is further configured to, based on the file being transmitted to the server, receive, from the server, an advertisement; and
   the peripheral device is configured to perform one or both of (i) printing the contents of the advertisement, and (ii) displaying the contents of the advertisement on a display of the peripheral device.

15. The peripheral device of claim 9, further comprising:
- a rendering module configured to determine that the peripheral device cannot render the file, as received by the communication interface, in the format that can be printed by the peripheral device,
- wherein in response to the determination that the peripheral device cannot render the file in the format that can be printed by the peripheral device, the transmission module is configured to transmit, to the server, the file.

16. The peripheral device of claim 9, wherein the peripheral device is a printer.

* * * * *